(12) United States Patent
Ibaraki et al.

(10) Patent No.: US 6,993,855 B2
(45) Date of Patent: Feb. 7, 2006

(54) METHOD FOR DRYING COMPACT CONTAINING METAL OXIDE, METHOD FOR REDUCING METAL OXIDE, AND ROTARY-HEARTH-TYPE METAL REDUCING FURNACE

(75) Inventors: Tetsuharu Ibaraki, Kimitsu (JP); Takashi Yamamoto, Kimitsu (JP); Yoichi Abe, Futtsu (JP); Shigeki Takahashi, Futtsu (JP); Kazunori Nagai, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/491,033

(22) PCT Filed: Apr. 1, 2002

(86) PCT No.: PCT/JP02/03273

§ 371 (c)(1),
(2), (4) Date: Mar. 26, 2004

(87) PCT Pub. No.: WO03/031659

PCT Pub. Date: Apr. 17, 2003

(65) Prior Publication Data

US 2004/0237335 A1 Dec. 2, 2004

(30) Foreign Application Priority Data

Sep. 27, 2001 (JP) ............................ 2001-296084

(51) Int. Cl.
*C21B 13/10* (2006.01)

(52) U.S. Cl. ............................ 34/312; 34/315; 75/484; 75/485

(58) Field of Classification Search ................. 34/312, 34/315, 60, 62, 65, 66; 432/137, 138, 195; 75/484, 485
See application file for complete search history.

(56) References Cited

U.S. PATENT DOCUMENTS

| 3,759,693 A | * | 9/1973 | Kunii et al. ................... 75/479 |
| 5,019,689 A | * | 5/1991 | Bollier et al. ............... 432/138 |
| 5,730,775 A | | 3/1998 | Meissner et al. |
| 6,015,527 A | * | 1/2000 | Kamei et al. ............... 266/145 |

FOREIGN PATENT DOCUMENTS

| JP | 52-61108 A | 5/1977 |
| JP | 11-12619 A | 1/1999 |

(Continued)

*Primary Examiner*—Jiping Lu
(74) *Attorney, Agent, or Firm*—Kenyon & Kenyon

(57) ABSTRACT

The present invention provides: a method for drying compacts containing water so as not to cause explosion and powdering; a method for reducing the compacts after being dried with great efficiency in a rotary-hearth-type reducing furnace; and a rotary-hearth-type metal reducing furnace. In the present invention, when compacts comprising powder containing metal oxide and carbon are dried, the critical value of a water evaporation rate, beyond which explosion occurs, is determined from the size and porosity of the compacts, then the water evaporation rate is controlled to a value not exceeding the critical value and, by so doing, the increase in the internal pressure of the compacts caused by the generation of water vapor is prevented. By the method, the explosion and cracking of the compacts are prevented. Further, when compacts are dried in a rotary-hearth-type reducing furnace, explosion is prevented by controlling the heat supply rate to the compacts through the above method and successively the compacts are incinerated and reduced in the same furnace.

13 Claims, 3 Drawing Sheets

FOREIGN PATENT DOCUMENTS

| | | |
|---|---|---|
| JP | 11-12621 A | 1/1999 |
| JP | 11-12624 A | 1/1999 |
| JP | 11-335746 | 12/1999 |
| JP | 11-337264 | 12/1999 |
| JP | 2000-109912 | 4/2000 |
| JP | 2001-32005 A | 2/2001 |
| JP | 2001-234220 A | 8/2001 |
| WO | WO 01/42516 | 6/2001 |

* cited by examiner

DIRECTION OF ROTATION →

DIRECTION OF ROTATION →

METHOD FOR DRYING COMPACT CONTAINING METAL OXIDE, METHOD FOR REDUCING METAL OXIDE, AND ROTARY-HEARTH-TYPE METAL REDUCING FURNACE

TECHNICAL FIELD

The present invention relates to: a method for drying compacts produced by forming powder containing metal oxide and carbon, these being contained in dust, sludge and the like generated, for example, in the refining and processing of metals; a method for reducing the dried compacts in a reducing furnace equipped with a rotary hearth; a method for drying and successively reducing compacts into metal in a reducing furnace equipped with a rotary hearth; and further a metal reducing furnace of a rotary-hearth-type.

BACKGROUND ART

There are various types of processes as processes for producing reduced iron and ferroalloy and, among those processes, rotary-hearth-type processes are practically used as the processes having high productivity. A rotary-hearth-type process is the one mainly composed of an incinerator of the type wherein a refractory hearth having the toroidal shape of a disc (the center of which is lacked) rotates at a constant speed (hereunder referred to as "rotary furnace") on rails under fixed refractory ceiling and sidewalls and is used for reducing metal oxide. The diameter of the hearth of a rotary furnace is 10 to 50 m and the width thereof is 2 to 6 m.

Powder containing metal oxide as raw material is mixed with a carbon-type reducing agent, is thereafter formed into raw material pellets, and is fed to a rotary furnace. An advantage of this is that the raw material pellets are laid close and still on the hearth and therefore the raw material pellets hardly collapse in the furnace. Another advantage thereof is that the problem of powdered raw material sticking to refractories is avoided and thus the bulk yield of the product is high. Further, this method has so far been employed increasingly since it has a high productivity and allows a less expensive carbon-type reducing agent and powdered raw material to be used.

In addition, a rotary hearth process is also effective for reducing steelmaking dust generated from a blast furnace, a converter and an electric arc furnace and thickener sludge generated from a rolling mill and removing impurities, thus is used also as a dust processing means, and is a process effective for the recycling of resources.

The operation of a rotary hearth process is outlined hereunder.

Firstly, a carbon-type reducing agent is mixed with metallic oxide comprising raw material of ore, dust and sludge in the amount required for reducing the metallic oxide and thereafter the mixture is formed into pellets several to over ten mm in size with a granulator such as a pan-type pelletizer while water is sprayed so that water content is about 10%. When the grain sizes of raw material ore and a reducing agent are large, they are crushed with a crusher such as a ball mill and thereafter kneaded and granulated.

The pellets are fed to a rotary hearth and laid in layers. The pellets laid on the hearth in layers are heated rapidly and incinerated for 5 to 20 min. at a high temperature of about 1,300° C. During the process, metal oxide is reduced by the reducing agent. mixed in the pellets and metal is formed. The metallization ratio after the reduction varies in accordance with metal to be reduced, and is 95% or more in the case of iron, nickel, or manganese and 50% or more even in the case of chromium that is hard to reduce. Further, when dust coming from the steelmaking industry is processed, impurities such as zinc, lead, alkali metal, chlorine, etc. are volatilized and removed in accordance with the reducing reaction and therefore the dust may easily be recycled to a blast furnace or an electric arc furnace.

In such a method of reducing metal and steelmaking dust with a rotary hearth, to form raw material and a reducing agent into pellets is an essential requirement. Therefore, it is important to put the mixture of metal oxide powder as raw material and a reducing agent in the state liable to be granulated in a preliminary treatment of the raw material and, for that purpose, various methods such as preliminary crushing of raw material, kneading in a ball mill and the like are employed.

As explained above, the reduction of metal oxide by the conventional rotary hearth method is excellent in productivity and production costs and is a method for producing metal economically. However, the problems of the method have been that: it is important to pelletize raw material and a reducing agent; thus it is necessary either to select raw material having an excellent granulation property or to improve a granulation property by installing an expensive crusher and crushing raw material. This incurs a large cost.

Actually, when ore such as iron ore is used as raw material, as the size of the raw material ore is large, the raw material has generally been crushed into several tens of microns in average diameter and thereafter granulated and produced into pellets. For that reason, the drawbacks of the method have been that: the cost of equipment for a crushing process is high; electricity is required for the operation of a crusher; and the maintenance accompanying the wear of the crusher is expensive.

There are some cases where pulverized raw material is used for saving a crushing cost. However, in such a case, the selection of raw material is limited and thus it has not been a commonly adaptable method. For solving the problem, it is effective to use powdered ore after wet separation, thickener dust from a blast furnace or a converter, sludge in a scale pit of a rolling process, precipitated sludge from a pickling process, or the like. However, in those cases too, a problem has been that a water content is sometimes excessive and therefore raw material is hardly granulated. In particular, such raw material is composed of very fine powder one to several tens microns in size and, as a result, it is likely to be slurry in the state of containing water, or, even after the raw material is dehydrated with a vacuum dehydrator or a filter press, water remains by 30 to 50% and, as it is, it is difficult to granulate because too much water is contained.

One of the methods for solving the problems is to granulate powder raw material after it has been dried completely with a heat source such as a hot blast. However, in this method, the powder raw material forms a pseudo-agglomeration during the drying and thus it is impossible to granulate it as it is. Therefore, the pseudo-agglomeration of the powder raw material has been crushed, formed in the state of fine powder again, thereafter mixed with other material and water, then granulated and, thereafter, reduced on a rotary hearth.

As a result, when the above method is employed, good compacts can be produced and, if the compacts are dried efficiently, metal oxide is reduced stably. However, by a conventional technology, a method for drying such compacts, in consideration of the physical state of the compacts, is not established sufficiently and it has merely been considered that only the drying of the compacts is enough. As a result, there have been problems in that the compacts crack and powdering occurs abundantly from the surfaces thereof. Furthermore, when drying conditions are worse, the compacts have sometimes exploded. Therefore, a means for solving the problems has been desired for a long time. Here, though a method of drying compacts beforehand is an effective means, the problem of the method is still that the method requires a heat source and a device for exclusively vaporizing the water content, even after the compacts are dried, by consuming a large amount of heat and is somewhat disadvantageous economically.

In particular, when dust or sludge generated in the metal refining industry and processing industry such as the steel-making industry is collected from a wet dust collector or a settling tank, the dust or sludge contains a large amount of water, 90% at the most, and when it is attempted to reduce it by a rotary hearth process, the drying process and the succeeding crushing process have been problems.

As a method of using raw material without granulation in a rotary hearth process for solving the problems, for example, Japanese Unexamined Patent Publication No. H11-12619 discloses the method wherein raw material is formed into a tile shape with a compression molding machine and used in a rotary hearth process. Even in this method however, there have been problems in using raw material containing a large amount of water. That is, the problems have been that, as shown in Japanese Unexamined Patent Publication No. H11-12624: the water content in raw material is required to be adjusted to 6 to 18% and for that purpose a drying process is required in addition to a preliminary dehydration process; for that reason the complicated control of a water content is required. Further, another problem has been that, in order to charge such raw material, a complicated charging machine is required as shown in Japanese Unexamined Patent Publication No. H11-12621 and the maintenance cost of the equipment is high.

Further, when such a type of raw material, containing water, is directly charged into a high temperature rotary furnace, the problems have been that: explosion occurs due to a high water content in accordance with the evaporation of water; the raw material is pulverized and taken away with an exhaust gas; and thus the product yield deteriorates extremely. In a rotary hearth process, the temperature in the furnace is generally the lowest in the vicinity of a raw material inlet and about 1,150° C. to 1,200° C. even there. At such a high temperature, compacts in a wet state entail the problem of explosion accompanying sudden water evaporation. Even when an explosion does not arise, exfoliation occurs at the corner portions and the surface due to the eruption of water vapor. Therefore, even though reduction operation can be carried out, there have been the problems in that the bulk ratio of the reduced product decreases and the ratio of powder generated from the compacts increases. As a result, there remain the problems in that the ratio of powder metal that is lost in an exhaust gas increases relatively and the yield deteriorates.

The object of the present invention is to provide: a method for drying efficiently compacts comprising powder raw material containing water without the generation of explosion or cracking; a method for reducing compacts that makes it possible to reduce the compacts at a high yield without the generation of an explosion or the like even when compacts, in the state of powder containing water, are supplied directly to a rotary furnace and reduced; and a rotary-hearth-type metal reducing furnace therefor, those having not so far been realized by conventional methods.

DISCLOSURE OF THE INVENTION

The present invention has been established in view of the above problems and the gist thereof is as follows:

(1) A method for drying compacts characterized by, in the event of drying compacts containing powder of metal oxide and carbon and also water in mass percentage by not less than 0.2 times the porosity in percentage, controlling the evaporation rate of water contained in said compacts to not more than the value V defined below;

$$V = 300 P^2 / D,$$

where, V means a critical evaporation rate of water (an evaporation rate of water per one dry mass kilogram of compacts (g/kg/sec.)), D a cube root of the volume of a compact (mm), and P a porosity (−).

(2) A method for drying compacts characterized by, in the event of drying compacts containing powder of metal oxide and carbon and also water in mass percentage by not less than 0.2 times the porosity in percentage, controlling the rate of heat supply to said compacts to not more than the value Hin defined below;

$$Hin = 820 P^2 / D,$$

where, Hin means a critical heat supply rate (a heat supply rate per one dry mass kilogram of compacts (kw/kg)), D a cube root of the volume of a compact (mm), and P a porosity (−).

(3) A method for drying compacts according to the item (1), characterized by, in the event of drying compacts having a cube root of the volume of 5 to 21 mm and a porosity of 22 to 32% from the state wherein 4.4 mass % or more of water is contained in said compacts, controlling the evaporation rate of water in said compacts to not more than 0.7 g/sec. per one dry mass kilogram of compacts.

(4) A method for drying compacts according to the item (2), characterized by, in the event of drying compacts having a cube root of the volume of 5 to 21 mm and a porosity of 22 to 32% from the state wherein 4.4 mass % or more of water is contained in said compacts, controlling the rate of heat supply to said compacts to not more than 1.9 kw per one dry mass kilogram of compacts.

(5) A method for drying compacts according to the item (1), characterized by, in the event of drying compacts having a cube root of the volume of 5 to 21 mm and a porosity of more than 32 to 40% from the state wherein 6.4 mass % or more of water is contained in said compacts, controlling the evaporation rate of water in said compacts to not more than 1.3 g/sec. per one dry mass kilogram of compacts.

(6) A method for drying compacts according to the item (2), characterized by, in the event of drying compacts having a cube root of the volume of 5 to 21 mm and a porosity of more than 32 to 40% from the state wherein 6.4 mass % or more of water is contained in said compacts, controlling the rate of heat supply to said compacts to not more than 3.5 kw per one dry mass kilogram of compacts.

(7) A method for drying compacts according to the item (1), characterized by, in the event of drying compacts having a cube root of the volume of 5 to 21 mm and a porosity of more than 40 to 55% from the state wherein 8 mass % or more of water is contained in said compacts, controlling the evaporation rate of water in said compacts to not more than 2.3 g/sec. per one dry mass kilogram of compacts.

(8) A method for drying compacts according to the item (2), characterized by, in the event of drying compacts having a cube root of the volume of 5 to 21 mm and a porosity being more than 40 to 55% from the state wherein 8 mass % or more of water is contained in said compacts, controlling the rate of heat supply to said compacts to not more than 6.2 kw per one dry mass kilogram of compacts.

(9) A method for drying compacts according to any one of the items (1) to (8), characterized by using powder containing metallic oxide derived from a metal producing process and carbon individually or in mixture as said powder of metal oxide and carbon.

(10) A method for reducing metal oxide characterized by incinerating and reducing compacts dried by a method according to any one of the items (1) to (8) at 1,100° C. or higher in a rotary-hearth-type furnace wherein compacts containing powder of metal oxide and carbon are loaded on the upper surface of a rotating toroidal hearth and incinerated and reduced by gas combustion heat at the upper inner space of the furnace.

(11) A method for reducing metal oxide characterized by incinerating and reducing compacts dried by a method according to the item (9) at 1,100° C. or higher in a rotary-hearth-type furnace wherein compacts containing powder of metal oxide and carbon are loaded on the upper surface of a rotating toroidal hearth and incinerated and reduced by gas combustion heat at the upper inner space of the furnace.

(12) A method for reducing metal oxide characterized by, after drying compacts by a method according to any one of the items (1) to (8) in a rotary-hearth-type furnace wherein compacts containing powder of metal oxide and carbon are loaded on the upper surface of a rotating toroidal hearth and incinerated and reduced by gas combustion heat at the upper inner space of the furnace, successively incinerating and reducing said compacts at 1,100° C. or higher in said furnace.

(13) A method for reducing metal oxide characterized by, after drying compacts by a method according to the item (9) in a rotary-hearth-type furnace wherein compacts containing powder of metal oxide and carbon are loaded on the upper surface of a rotating toroidal hearth and incinerated and reduced by gas combustion heat at the upper inner space of the furnace, successively incinerating and reducing said compacts at 1,100° C. or higher in said furnace.

(14) A rotary-hearth-type metal reducing furnace, wherein compacts containing powder of metal oxide and carbon are loaded on the upper surface of a rotating toroidal hearth and incinerated and reduced by gas combustion heat at the upper inner space of the furnace and the reduced compacts are discharged, characterized in that the area of the rotary furnace from the portion where the raw material powder compacts are supplied to a portion 30 to 130 degrees apart from said portion in the rotation direction is used as the drying zone of the compacts.

(15) A rotary-hearth-type metal reducing furnace according to the item (14), characterized in that: an exhaust gas flue is installed at a portion 30 to 130 degrees apart from the portion where the raw material compacts are supplied in the rotation direction; and the area from the portion where the raw material compacts are supplied to the portion where the exhaust gas flue is installed is used as the drying zone.

(16) A rotary-hearth-type metal reducing furnace according to the item (14), characterized in that: a partition having a gap between the lower end thereof and the rotary hearth is installed at a portion 30 to 130 degrees apart from the portion where the raw material compacts are supplied in the rotation direction; and the area from the portion where the raw material compacts are supplied to the portion where the partition is installed is used as the drying zone.

(17) A rotary-hearth-type metal reducing furnace according to any one of the items (14) to (16), characterized by being equipped with a means for cooling the hearth between the portion where the reduced compacts are discharged and the portion where the raw material compacts are supplied.

(18) A rotary-hearth-type metal reducing furnace according to any one of the items (14) to (16), characterized by being equipped with water cooling means on the ceiling and parts of the sidewalls between the portion where the reduced compacts are discharged and the drying zone in the furnace.

(19) A rotary-hearth-type oxidizing metal reducing furnace according to any one of the items (14) to (16), characterized by being equipped with heating burners on the sidewalls of said drying zone.

(20) A rotary-hearth-type metal reducing furnace according to any one of the items (14) to (16), characterized by being equipped with: a means for cooling the hearth between the portion where the reduced compacts are discharged and the portion where the raw material compacts are supplied; and water cooling means on the ceiling and parts of the sidewalls between the portion where the reduced compacts are discharged and the drying zone in the furnace.

(21) A rotary-hearth-type metal reducing furnace according to any one of the items (14) to (16), characterized by being equipped with: a means for cooling the hearth between the portion where the reduced compacts are discharged and the portion where the raw material compacts are supplied; and heating burners on the sidewalls of the drying zone.

(22) A rotary-hearth-type metal reducing furnace according to any one of the items (14) to (16), characterized by being equipped with: water cooling means on the ceiling and parts of the sidewalls between the portion where the reduced compacts are discharged and the drying zone in the furnace; and heating burners on the sidewalls of the drying zone.

(23) A rotary-hearth-type metal reducing furnace according to any one of the items (14) to (16), characterized by being equipped with: a means for cooling the hearth between the portion where the reduced compacts are discharged and the portion where the raw material compacts are supplied; water cooling means on the ceiling and parts of the sidewalls between the portion where the reduced compacts are discharged and the drying zone in the furnace; and further heating burners on the sidewalls of said drying zone.

BRIEF DESCRIPTION OF THE DRAWINGS

FIG. 2 is a graph showing the relationship between the maximum water evaporation rate (the critical evaporation rate) in the situation where compacts do not explode or the rate of powdering is 10% or less during the drying of the compacts and the quotient obtained by dividing the square of a porosity ($P^2$) by the representative diameter D of a compact. Note that, in the figure, the unit of a critical evaporation rate is g/kg/sec. and the unit of the quotient obtained by dividing the square of a porosity ($P^2$) by the representative diameter D of a compact is 1/mm.

BEST MODE FOR CARRYING OUT THE INVENTION

Figure 1:
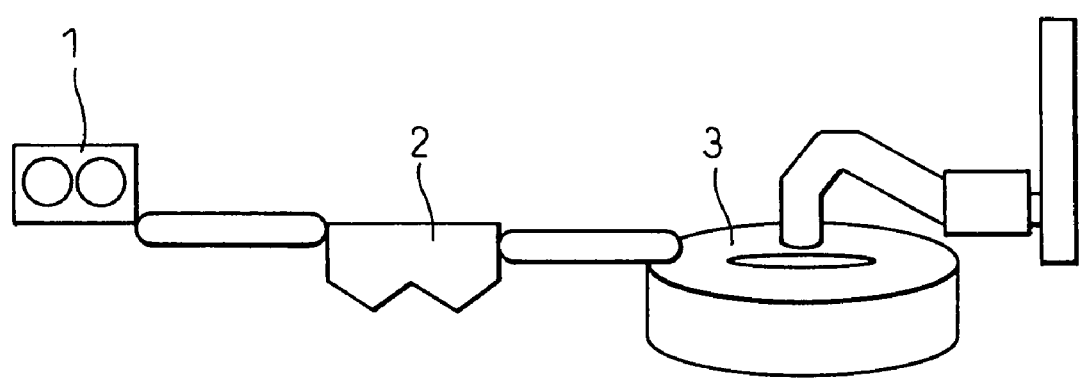
FIG. 1 is a view showing an example of equipment for reducing metal oxide, comprising a forming machine, a compact dryer and a rotary-hearth-type reducing furnace, to which the present invention is applied.

FIG. 1 shows an example of the entire configuration of reducing equipment comprising a rotary-hearth-type reducing furnace and a preliminary treatment apparatus of metallic oxide raw material to be fed to the reducing furnace on the basis of the present invention. The figure shows the entire configuration of equipment that produces compacts from powder with a forming machine and reduces them in a rotary-hearth-type reducing furnace. The equipment mainly comprises a forming machine 1, a compact dryer 2 and a rotary furnace 3. As a forming machine 1, any type may be employed and a pan-type pelletizer, a briquette forming machine or an extrusion forming machine is generally used, as described later. Further, a raw material storing apparatus and a product treatment apparatus are included in the equipment configuration, but they are not shown here because they are not important in the explanation on the method and equipment of the present invention. A powder containing metal oxide and carbon in the state of containing water is formed into compacts with a forming machine 1 and the formed compacts are dehydrated and dried with a compact dryer 2. Further, the dried compacts are incinerated and reduced in a rotary furnace 3. Note that, when compacts can withstand rapid drying or the heat load on the compacts can be reduced in the vicinity of the portion where the compacts are loaded in a rotary furnace 3 by the aftermentioned method of the present invention, the compact dryer 2 may be omitted.

The present invention is a method of properly drying compacts produced in the state of containing water, namely wet compacts, using powder containing metal oxide and carbon as raw material. In actual operation, a method wherein wet compacts are dried by hot blast or the like with an exclusive dryer or a method wherein wet compacts are dried at a relatively low temperature portion in a rotary furnace where a gas temperature is properly controlled is employed. In order to accomplish the above object, the present inventors searched for conditions for properly drying compacts comprising powder containing metal oxide and carbon. For that purpose, the present inventors carried out theoretical analyses on the flow of water vapor in compacts and experiments using a small hot blast dryer and a box type electric arc furnace.

Firstly, prior to the experiments, the present inventors carried out hydrodynamic technological analyses with respect to physical phenomena of gas flow at the time of evaporation of water in compacts from the viewpoint of the analysis of gas flow passing through a narrow path. Secondly, the present inventors carried out the experiments of drying actual compacts and established the treatment standard for drying compacts.

Firstly, on the basis of a physical model showing the relationship between a flow rate and resistance of a fluid flowing in fine pores, the present inventors analyzed the pressure at the time when water vapor flowed among particles in compacts. From the model analysis, it has been found that a flow resistance per unit length when water vapor flows in pores is inversely proportional to the diameter of the paths of the pores and is proportional to the flow rate of the water vapor. Further, as a result of the observation of the compacts, it has been found that the path diameter of pores is almost proportional to the porosity. Furthermore, from geometric conditions of the interior of compacts, it has been found that the flow rate of water vapor in paths is proportional to a water vapor generation rate per unit volume of compacts and is inversely proportional to the porosity. Here, a porosity is defined as the ratio of the volume of voids to the volume of compacts in the present invention and is generally a value obtained by dividing an apparent specific gravity of compacts by a true specific gravity of powder.

On the basis of the studies in consideration of hydrodynamic conditions and geometric conditions of compacts, when the porosity in compacts is constant, the following relational expression is established;

(Center portion pressure)=A (Path diameter)$^{-1}$ (Path length)(Water vapor flow rate in path), where, a path length is proportional to the diameter of compacts. Further, the expression is converted into the following expression from aforementioned relation;

(Center portion pressure)=B (Porosity)$^{-1}$ (Representative diameter) {(Water vapor generation rate per mass)/(Porosity)}=B (Water vapor generation rate per mass)(Porosity)$^{-2}$ (Representative diameter). Furthermore, the expression is converted into the following expression;

(Water vapor generation rate per unit mass)=C (Center portion pressure)(Porosity)$^2$/(Representative diameter), where A, B and C are constants influenced by the physical state of compacts and the physical properties of a gas.

An internal pressure increases as water vapor is generated. When an internal pressure exceeds the pressure under which compacts can withstand, there arise the problems of explosion, cracking and powdering of the surface of the compacts. The present inventors judged drying conditions as acceptable when neither explosion nor cracking occurred or the ratio of powder generated from a surface was 10% or less under the drying conditions. Here, a powdering ratio is defined by the ratio of the mass (mass %) of compacts less than 5 mm in size obtained when compacts after dried are sieved with a 5 mm sieve to the mass of the compacts before the sieving. From the results and the above expressions, a water vapor generation rate at an explosion limit was evaluated quantitatively. The limit (critical pressure) that compacts can withstand is a value related to the bonding strength of particles in the compacts and the main factor of the bonding strength is the phenomenon accompanying the physical adhesiveness among particles. The present inventors clarified that the bonding strength of particles in compacts was almost constant when a specific binder was not used. Here, a water vapor generation rate (critical evaporation rate) at the time when a center portion pressure reaches the critical pressure is expressed by the following expression (a) by formulating an evaluation expression in consideration of the aforementioned analysis results and the observation results of the compacts and summarizing the items to be evaluated with constant values;

$$V=KP^2/D \qquad (a).$$

Further, since an evaporation rate of water is proportional to a heat supply rate, the rate of heat supplied to compacts at a critical pressure (critical heat supply rate) is shown by the following expression (b);

$$Hin = LP^2/D \qquad (b).$$

In the expressions (a) and (b), V means a water vapor evaporation rate per dry mass kg of compacts at the critical pressure (g/kg/sec.), Hin a heat supply rate per dry mass kg of compacts at the critical pressure (kw/kg), P a porosity (-), and D a cube root of the volume of a compact (mm) that represents the size of the compact. Here, K and L are the constants. In order to evaluate compacts having different shapes in the same way, a cube root of the volume of a compact is used for the evaluation of the size of the compact and is hereunder referred to as the representative diameter.

In order to determine the constants K and L of the expressions (a) and (b) that stipulated appropriate drying conditions, experiments were carried out by using a heater for experiments. In the experiments, a hot blast type dryer 5 liters in volume and an electric arc furnace 10 liters in volume were used. Raw material for the experiments was powder to be used in a rotary-hearth-type reducing furnace. The powder had average diameters of 4 to 50 microns and contained 63 mass % iron oxide and 15 mass % carbon. The compacts used for the experiments were as follows; ① spherical compacts produced with a pan-type pelletizer and having a porosity of 22 to 32%, ② compacts produced with a briquette forming machine and having a porosity of over 32 to 40%, and ③ columnar compacts produced with an extrusion forming machine and having a porosity of more than 40 to 55%. Those forming methods are explained below. The compacts ① were produced by rotating fine powder on a rotating disc, the compacts ② were formed by using a pair of rolls having dimples on their surfaces and pushing powder into the dimples while the rolls were rotating, and the compacts ③ were formed by pushing wet powder into a penetrating nozzle. Here, the representative diameters of the compacts were 5 to 21 mm.

In the experiments, the heat supply rates to the compacts were changed variously by changing the hot blast temperature of the hot blast type dryer or the internal temperature of the box type electric arc furnace. Among the test results, the cases where explosion did not occur and the powdering loss from the surface was 10% or less (powdering ratio was 10% or less) were judged to be good drying conditions. The upper limit of an evaporation rate in the drying under such good drying conditions was defined as a critical evaporation rate (namely, water amount evaporated for one second per dry mass kg of compacts) and the heat supply rate at the time was defined as a critical heat supply rate. Thereafter, those values were determined.

The results are shown in FIG. 2. FIG. 2 shows the relationship between the quotient obtained by dividing the square of a porosity by the representative diameter of a compact ($P^2/D$) and the critical evaporation rate (V). The results were subjected to a multiple regression analysis and the value K in the expression (a) was determined to be 300. Further, the value L in the expression (b) that determined a critical heat supply rate (Hin) was 820. Here, the unit of V was g/kg/sec., the unit of Hin was kw/kg, and P had no units.

$$\text{Critical evaporation rate} = 300P^2/D \qquad (1),$$

$$\text{Critical heat supply rate} = 820P^2/D \qquad (2).$$

Further, in the experiments, when a water ratio was less than 0.2 times a porosity, explosion and powdering of a surface did not occur even though the values deviated from the critical values calculated from the expressions (1) and (2) because the generated water vapor amount was small. Therefore, the present invention is effective in the case where a water ratio is not less than 0.2 times a porosity.

On the basis of the above analysis results, operations for drying compacts are carried out appropriately with actual equipment. The compact dryer 2 in the equipment shown in FIG. 1 is a hot blast type and the heat supply rate to the compacts is controlled. Note that, the dryer 2 may be of any type as long as the heat supply rate is controllable. The compacts containing water that have been produced by the aforementioned three methods with the forming machine 1 are supplied to the compact dryer 2. Here, a heat supply rate not higher than the critical heat supply rate V obtained from the expression (2) is employed in accordance with the representative diameter and the porosity of the compacts. It is effective to adjust a heat supply rate by the temperature and the flow rate of hot blast. The evaporation rate of water of the compacts at the time is controlled to a value not higher than the critical evaporation rate obtained from the expression (1) in accordance with the representative diameter and the porosity of the compacts likewise.

In an actual operation by a rotary hearth process, the compacts used in a rotary furnace 3 have appropriate sizes for improving the heat transfer property in the compacts and maintaining the shapes of the compacts and a desirable representative diameter is in the range from 5 to 21 mm. The reason is as follows: when compacts are too large and in excess of 21 mm in representative diameter, the inside heat transfer becomes slow, the reduction does not complete within the 7 to 20 min. that is an appropriate reduction time range in a rotary furnace, and cracking occurs at the time of falling; and, on the other hand, when a representative diameter is 5 mm or less, the compacts are too small, the compacts have to be loaded in three to five layers for securing an appropriate amount of the compacts per floor area and, in this case the heat transfer of the compacts in the middle layers is deteriorated, thus the reducing reaction is also deteriorated.

The compacts produced with the forming machine 1 are dried with the compact dryer 2. In the case of dense compacts that are produced by such a method as to use a pan-type pelletizer and have a porosity of 22 to 32%, the water evaporation rate is controlled to not more than 0.7 g/sec. per one dry mass kg of compacts when the compacts having the representative diameter of 5 to 21 mm are dried from the state of containing not less than 4.4 mass % water. The water evaporation rate is within the critical evaporation rate obtained from the expression (1), thus in the good drying conditions, and does not cause the problems of explosion and powdering of the compacts. In this drying method, a heat supply rate is controlled to not more than 1.9 kw per one dry mass kg of compacts. The heat supply rate is relatively low and therefore the compacts should be dried at a relatively low temperature. A desirable drying temperature is 400° C. or lower in the case of a hot blast type dryer.

In the case of compacts that are produced by a method using a briquette forming machine and have a porosity of more than 32 to 40%, the water evaporation rate of the compacts having the representative diameter of 5 to 21 mm is controlled to not more than 1.3 g/sec. per one dry mass kg of compacts when the compacts are dried from the state of containing not less than 6.4 mass % water. In this drying method, the average heat supply rate is controlled to not more than 3.5 kJ per one dry mass kg of compacts. In the drying of such compacts, as a somewhat higher heat supply rate is allowed, a desirable drying temperature is in the range from 200° C. to 550° C. in the case of a hot-blast-type dryer.

Further, in the case of very porous compacts that are produced by a method using an extrusion forming machine and have a porosity of more than 40 to 55%, the water evaporation rate of the compacts having the representative diameter of 5 to 21 mm is controlled to not more than 2.3 g/sec. per one dry mass kg of compacts when the compacts are dried from the state of containing not less than 8 mass % water. In the drying method, the average heat supply rate is controlled to not more than 6.3 or 6.2 kw per one dry mass kg of compacts. In this drying of the compacts, as a relatively high heat supply rate is allowable, a desirable drying temperature is in the range from 300° C. to 900° C. in the case of a hot blast type dryer. Further, if a shorter drying time is desired, the most appropriate drying temperature is about 800° C.

In the aforementioned case of drying compacts with a dryer, when the compacts are loaded on a rotary furnace 3, the temperature at the portion where the compacts are supplied is high, thus explosion and powdering caused by rapid heating are problems and, therefore, it is desirable to control the water content of the compacts after drying to not more than 1 mass %.

After the compacts are dried, they are fed to a rotary furnace 3. As the compacts do not contain excessive water, the problems of explosion and powdering do not occur even when the heating rate of the compacts is high in the rotary furnace 3. For example, such a high heating rate that the surface temperature of compacts is raised to 1,200° C. for about 3 min. may be acceptable. The compacts are incinerated by being heated in the furnace. As a result, carbon contained in the compacts functions as a reducing agent and reduces solid iron oxide and solid manganese oxide. In this case, the reduction proceeds if the maximum temperature is 1,100° C. or higher, desirably 1,200° C. to 1,400° C. and, under this condition, the reducing reaction terminates in 7 to 15 min. The compacts having been incinerated and reduced are discharged from the rotary furnace 3. Thereafter, the high temperature compacts are cooled with a reduced compact cooling device not shown in FIG. 1 and reduced products are obtained. When the reduced products are used at a high temperature in an electric arc furnace or the like, a cooling process may be omitted in some cases.

Figure 3:
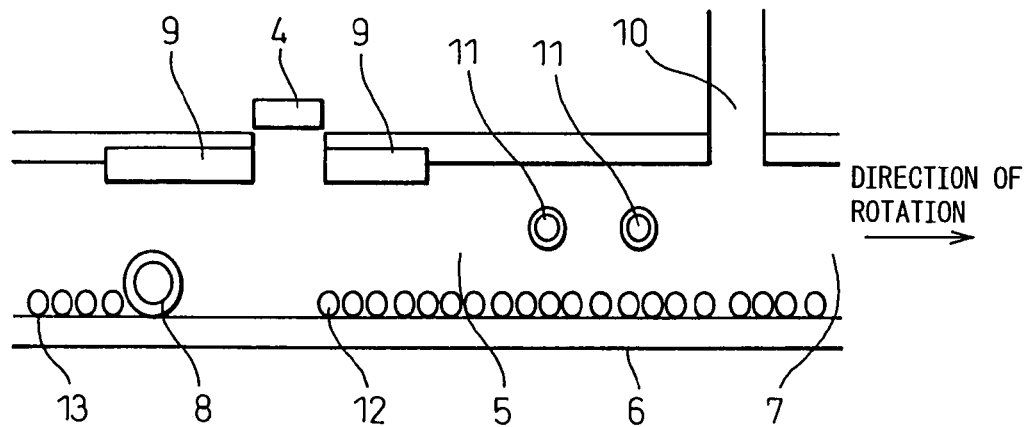
FIG. 3 is a view showing the structure of a rotary-hearth-type metal reducing furnace having the function of drying compacts in the furnace and a means for cooling the hearth and the atmosphere in the furnace according to the present invention.

There is a method of drying compacts in a rotary furnace 3 without the use of a compact dryer 2. An example of the equipment configuration is the one obtained by removing the compact dryer 2 from the equipment configuration shown in FIG. 1. An example of the structure of a rotary furnace having such a function is shown in FIG. 3. FIG. 3 is a sectional view of a rotary furnace 3 in the circumferential direction and shows the structure in the vicinity of the drying zone. In the structure, compacts in a wet state are loaded on the hearth 6 in the drying zone 5 with the compact feeder 4 and the compacts 12 are dried there. The hearth 6 rotatively moves toward the right continuously and feeds the compacts 12 having dried to the reducing zone 7. In the reducing zone 7, the compacts 12 are incinerated and reduced. In the method of drying compacts 12 in a furnace too, it is necessary to properly control the heat supply rate at the portion where compacts 12 are supplied so that the explosion of the compacts 12 and the powdering of the surface thereof may not occur. In the drying zone 5 too, it is necessary to control the water evaporation rate of compacts 12 to not more than the critical evaporation rate (V) and further the heat supply rate to not more than the critical heat supply rate (Hin).

In the case of compacts 12 that are produced with a pan-type pelletizer 1 and have the porosity of 22 to 32% and the representative diameter of 5 to 21 mm, the water evaporation rate from the state of not less than 4.4 mass % water is controlled to not more than 0.7 g/sec. per one dry mass kg of compacts 12 at the drying zone 5. Further, the heat supply rate is controlled to not more than 1.9 or 1.8 kw per one dry mass kg of compacts 12. In this method, the compacts 12 should be dried while the portion where the compacts 12 are supplied is kept at a relatively low temperature. In order to reduce such dense compacts after they are dried, an exclusive dryer, as shown in the equipment configuration of FIG. 1, is generally used for the drying. However, when such an exclusive dryer is omitted, the atmospheric temperatures at the portions before and after the portion where the compacts 12 are supplied in a rotary furnace 3 are lowered and wet compacts 12 are fed. When compacts have the porosity of 22 to 32%, a preferable temperature at this portion is 200° C. to 450° C.

In a rotary furnace 3, a hearth 6 of a high temperature moves continuously to the portion where raw material compacts are supplied, namely the raw material compact supply portion and, therefore, the atmospheric temperature usually becomes about 800° C. to 1,000° C. if no measures are taken. Therefore, some sort of technological contrivances are required for lowering the temperature at the raw material compact supply portion to about 200° C. to 450° C. That is, it is necessary to cool the hearth 6 before the compacts 12 are supplied, avoid introducing exhaust gas generated during the incineration and reduction in the reducing zone 7 to the portion, and compulsorily cool the portions before and after the portion where the compacts 12 are supplied. FIG. 3 shows an example of equipment having the structure that absorbs radiant heat of the hearth 6 by installing the water cooling panels 9 on the ceiling between the screw discharger 8 for discharging the reduced compacts 13 and the compact feeder 4 and on the parts of the ceiling in the drying zone 5. Further, the drying zone 5 and the reducing zone 7 are separated from each other with the exhaust gas discharging flue 10 so that the high temperature exhaust gas in the reducing zone 7 may not flow in. In this case, at the latter half of the drying zone 5, since only the heat transferred from the hearth 6 is insufficient for supplying heat to the compacts 12, heating burners 11 may be installed on the sidewalls and heat source for drying may be supplied from the burners.

In the case of compacts having a porosity of more than 32 to 40%, such as the compacts produced with an aforementioned briquette forming machine, as long as the heat supply rate is controlled to about 3.5 kw per one dry weight kg of compacts and the water evaporation rate is also controlled up to 1.3 g/sec. per one dry weight kg of compacts, explosion of the compacts 12 and the powdering of the surface thereof do not occur. The atmospheric temperature of the drying zone 5 in the rotary furnace 3 that corresponds to the heat supply rate should be 800° C. or lower. Further, in order to avoid a drying time of 5 min. or longer of the compacts 12, a preferable atmospheric temperature is 350° C. or higher. In this way, the atmospheric temperature of the drying zone 5 is lowered for the purpose of lowering the heat supply rate. However, as the atmospheric temperature may be relatively high, it is not necessary to compulsorily cool the atmosphere of the drying zone 5 and the hearth 6 in many cases. In those cases, an equipment configuration that excludes the water cooling panels 9 from the equipment configuration shown in FIG. 3 is employed. Then, the exhaust gas of incineration and reduction is prevented from flowing into the drying zone 5 and also heat is supplemented by combustion using the heating burners 11 in the drying zone 5. It is desirable to control the heat quantity generated by the heating burners 11 to 0.2 to 0.7 times the heat quantity per circumferential length generated by the burners at the other portions of the rotary furnace 3.

In the case of compacts having a porosity of more than 40 to 55%, such as the compacts produced with an extrusion forming machine or the like, as long as the heat supply rate is controlled up to 6.2 kw per one dry weight kg of compacts and also the water evaporation rate is controlled up to 2.3 g/sec. per one dry weight kg of compacts, explosion and the powdering of a surface do not occur. In the case where such a relatively high heat load is accepted, the temperatures of the atmosphere of the drying zone 5 and the hearth 6 in the rotary furnace 3 are controlled to 600° C. to 1,170° C. Here, as the atmospheric temperature is lowered by the influence of water vapor generated from the compacts 12 or the like, as long as the temperature range is maintained, cooling with a specific device is not required. Inversely, strong heating may be required in some cases.

In order to satisfy the aforementioned conditions and at the same time to control the atmospheric temperature of the drying zone 5 with high accuracy, it is, after all, preferable to employ the equipment configuration shown in FIG. 3, prevent the exhaust gas of incineration and reduction from flowing into the drying zone 5, and install the heating burners 11 at the portion up to the vicinity of the compact feeder 4. It is desirable to control the heat quantity generated by the heating burners 11 to 0.5 to 2 times the heat quantity per circumferential length generated by the burners at the other portions of the rotary furnace 3. When compacts 12 having a high porosity are dried in a rotary furnace 3 in this way, the heat transfer rate may be relatively high and a device having a simplified structure may be accepted, and therefore the method is excellent in equipment cost and operation cost.

The time period spent for drying compacts 12 in the drying zone 5 is controlled to 60 to 300 sec. When drying is finished in the short time of 60 sec. or less, the heat amount supplied for drying the compacts 12 is too much in many cases and the problem arising in the case of large compacts 12 is that water remains in the core portions of the compacts 12. On the other hand, the drying of the compacts 12 is completed within 300 sec. in most cases and therefore the drying exceeding 300 sec. causes a large energy loss and a larger equipment size. For those reasons, a preferable drying time is in the range from 60 to 300 sec. As stated above, when various compacts 12 having different porosities are dried, the atmospheric temperature of the drying zone 5 is controlled to 200° C. to 1,170° C. The atmospheric temperature is changed in accordance with the porosity of the compacts 12.

The length of the drying zone 5 in a rotary furnace 3 is defined by the length from the portion where raw material powder compacts 12 are supplied to a portion 30 to 130 degrees away from the portion in the rotation direction. The reasons are that: the drying time is in the range from 60 to 300 sec. and the reducing time is in the range from 8 to 20 min. (480 to 1,200 sec.); it is difficult to control the atmospheric temperature of the drying zone 5 independently when the length of the drying zone 5 is the length that corresponds to 30 degrees or less in arc angle; and others.

It is an effective means for the control of the atmospheric temperature of the drying zone 5 to install an exhaust gas discharging flue 10 at the boundary between the drying zone 5 and the reducing zone 7 so that the high temperature exhaust gas generated in the reducing zone 7 may not flow into the drying zone 5 as stated above and shown in FIG. 3. In this case, when the atmospheric temperature of the drying zone 5 lowers excessively, supplementary combustion is applied with the heating burners 11 on the sidewalls. On the other hand, when the atmospheric temperature of the drying zone 5 is excessively high, the structure for cooling the hearth 6 and the atmosphere is required as shown in FIG. 3. As a method of cooling the hearth 6, there is the method wherein the hearth 6 is cooled by installing water cooling panels 9 on the ceiling between the screw discharger 8 and the compact feeder 4 as stated above. In this case, the temperature of the hearth 6 is lowered by absorbing the radiant heat from the hearth 6 that has been exposed after the reduced compacts 13 have been discharged with metal water cooling panels 9. By this method, the surface temperature of the water cooling panels 9 is about 300° C. and the surface temperature of the hearth 6 is lowered to about 900° C. or lower with the cooling for 30 to 50 sec. Further, a method of spraying water on the hearth 6 through spray nozzles or the like at the portion upstream the compact feeder 4 is also effective for the cooling of the hearth 6.

Figure 4:
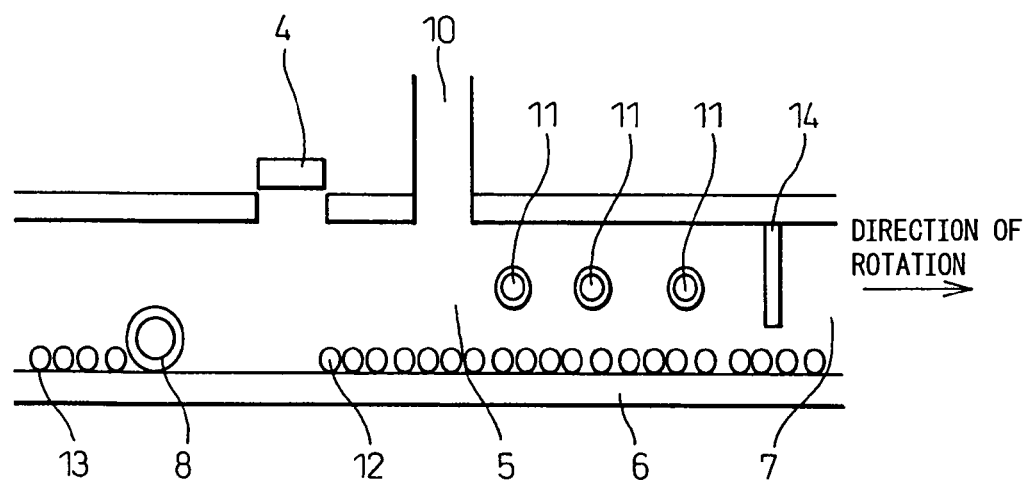
FIG. 4 is a view showing the structure of a rotary-hearth-type metal reducing furnace having the function of drying compacts in the furnace according to the present invention.

In this way, by the method of installing an exhaust gas discharging flue 10 at the boundary between the drying zone 5 and the reducing zone 7, it becomes possible to prevent a high temperature exhaust gas from flowing into the drying zone 5, thus lowering the atmospheric temperature of the drying zone 5 effectively, and to control the temperature with high accuracy. In contrast, in the case where the atmospheric temperature of the drying zone 5 may be 500° C. or higher or a similar case, there is also the method of installing a partition 14 having a gap at the lower portion at the boundary between the drying zone 5 and the reducing zone 7 as shown in FIG. 4. By the effect of the partition 14, the drying zone 5 and the reducing zone 7 are separated into independent zones and it becomes easy to control the atmospheric temperatures individually. When the control of an atmospheric temperature with high accuracy is not required, a partition 14 may not be required and a method of controlling the atmospheric temperature of the drying zone 5 independently from the reducing zone 7 may be employed.

Figure 5:
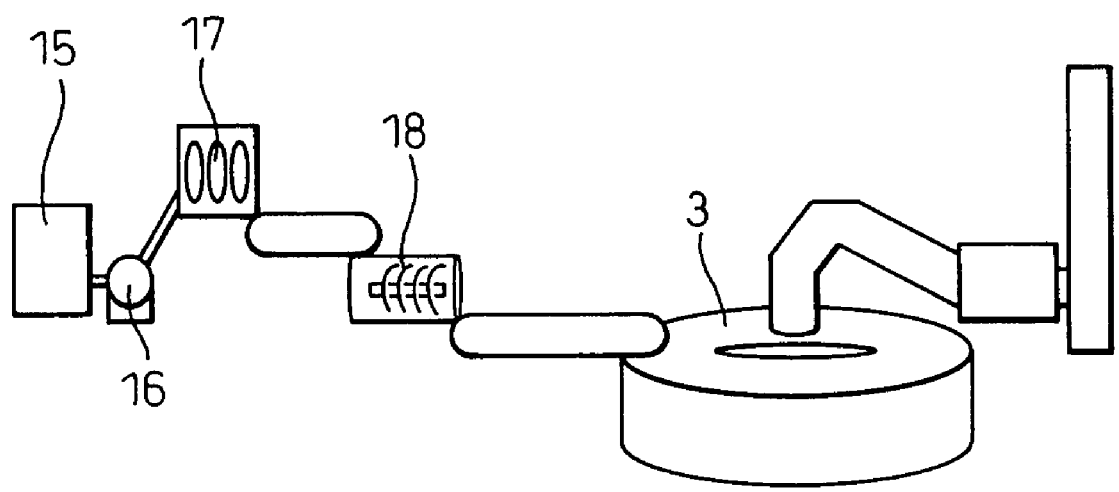
FIG. 5 is a view showing the outline of an example of equipment for reducing metal, comprising an extrusion forming machine and a rotary-hearth-type reducing furnace, to which the present invention is applied.

Next, a typical example of equipment configuration in the case of using an extraction forming machine, which is the most economical method as a process of excluding a dryer 2, is shown in FIG. 5. The methods for producing, drying and reducing compacts with this equipment are explained hereunder. Firstly, raw material comprising metal oxide powder in the state of containing not less than 50 mass % water and pulverized reducing agent mainly composed of carbon is mixed and contained in a mixing pit 15. As the metal oxide raw material, ore powder including iron ore powder, manganese ore powder, chromium ore powder, etc., dust from a refining furnace and sludge from a rolling process, those being generated in the metal producing industry, and others are used. In particular, sludge generated in the metal producing industry is the most suitable raw material because it contains about 70% water by nature.

The solid-liquid mixture of the raw material is stirred and mixed well in the mixing pit 15. The solid-liquid mixture is transported to a dehydrator 17 with a slurry transportation pump 16, dehydrated to the water content of 15 to 27 mass % with the dehydrator, and formed into water contained aggregates of the raw material mixture. As the dehydrator 17, a dehydrator of the type wherein solid-liquid mixture is poured on a filter cloth that moves in a circulatory manner and squeezed with a pair of press rolls installed above and under the filter cloth, a filter press, a centrifugal dehydrator or the like is preferably used. The produced water contained aggregates is fed to an extrusion forming machine 18 and formed into compacts while water is contained. It is preferable that the compacts 12 have a diameter of about 8 to 20 mm and a representative diameter of 5 to 21 mm. The compacts 12 is configured so that water vapor may be likely to be extracted and thus the compacts may be hardly exploded in a rotary furnace 3. Specifically, the porosity of the compacts 12 is controlled to 40 to 55%.

The compacts 12 are fed to the rotary furnace 3 in the state of containing 15 to 27 mass % water. In the rotary furnace 3, the compacts 12 are charged on a hearth 6 and thereafter dried in a drying zone 5 while the heating rate is controlled. Specifically, the compacts 12 are dried for 60 to 300 sec. at 600° C. to 1,170° C. The compacts 12 from which water has been removed (dried) in the drying zone 5 move together with the hearth 6 in the furnace, are transferred to a reducing zone 7 having a high temperature, are subjected to reducing reaction actively at the time when the temperature of the compacts 12 exceeds 1,100° C., and most of the metal oxide of the compacts 12 is transformed into metal. The reduced compacts 13 are discharged from the hearth 6 with a screw discharger 8. The reduced compacts 13 thus produced are used as raw material for a metal reducing furnace or a metal refining furnace including an electric arc furnace or a blast furnace.

EXAMPLES

The examples of the operation for drying and reducing compacts comprising the powder of metal oxide and carbon according to the present invention are explained hereunder. Firstly, Table 1 shows the results of Examples 1 to 3 obtained by drying compacts in an exclusive dryer 2 and thereafter incinerating and refining them in a rotary furnace 3. Here, the treatment conditions of Examples 1 to 3 are as follows. The raw material powder comprised 63 mass % iron oxide and 15 mass % carbon and the average diameter of the powder was 11 microns. The compacts were formed from the powder with three kinds of devices; a pan-type pelletizer, a briquette forming machine and an extraction forming machine. The compacts produced by those methods were dried in the drying furnace 2 by controlling the water evaporation rate to not more than V (critical evaporation rate) and the heat supply rate to not more than Hin (critical heat supply rate). Further, the compacts after dried were incinerated and reduced in the rotary furnace 3. In any of the reducing treatments, the reducing time was 15 min. and the atmospheric temperature during the reducing was 1,320° C. In contrast, in the case of Comparative Examples, the same compacts as Examples 1 to 3 were used and subjected to incineration and reduction. However, they were dried by controlling the water evaporation rate to more than V (critical evaporation rate) or the heat supply rate to more than Hin (critical heat supply rate). The other conditions were identical to Examples 1 to 3. The results are shown in Table 2.

Here, a powdering ratio was defined by the ratio of the mass (mass %) of the compacts less than 5 mm in size obtained by sieving the compacts after being dried with a sieve 5 mm in mesh to the total mass of the compacts before sieving. Likewise, a bulk yield of reduced products was defined by the ratio of the mass (mass %) of the compacts not less than 5 mm in size obtained by sieving the compacts after reduced with a sieve 5 mm in mesh to the total mass of the compacts before sieving, and an iron metallization ratio was defined by the ratio of the mass (mass %) of the metallic iron in the reduced products to the total iron mass.

TABLE 1

|   | Example 1 | Example 2 | Example 3 |
|---|---|---|---|
| Forming machine | Pan-type pelletizer | Briquette forming machine | Extrusion forming machine |
| Compact | Spherical | Almond-shaped | Columnar |
| Size *) (mm) | 15 | 18 | 17 |
| Porosity (%) | 27% | 33% | 47% |
| Water content (mass %) | 11.5% | 14.6% | 21.2% |
| Critical value of drying | | | |
| V value (g/kg · sec.) | 1.5 | 1.8 | 3.9 |
| Hin value (kw/kg) | 4.0 | 5.0 | 10.7 |
| Drying result | | | |
| Actual water evaporation rate (g/kg · sec.) | 0.77 | 1.3 | 2.7 |
| Actual heat supply rate (kw/kg) | 2.1 | 3.7 | 7.5 |
| Evaluation of drying state | | | |
| Existence of explosion | None | None | None |
| Powdering ratio (mass %) | 3.9% | 2.6% | 3.3% |
| Result of reduced product | | | |
| Iron metallization ratio (mass %) | 85% | 88% | 88% |
| Bulk product yield (mass %) | 92% | 88% | 86% |

*) Cube root of compact volume

Example 1 shows the results of the operation in the case of using compacts a produced with a pan-type pelletizer and having a porosity of 27%, which is relatively dense. The values of V and Hin computed from the size and the porosity of the compacts were 1.5 g/kg/sec. and 4.0 kw/kg, respectively. Meanwhile, the actual water evaporation rate and heat supply rate were 0.77 g/kg/sec. and 2.1 kw/kg, respectively. Therefore, explosion was not observed since the water evaporation rate was lower than the critical value and, further, the powdering from the compact surfaces was as low as 3.9%. As a result of reducing the compacts, the iron metallization ratio was as high as 85% and the bulk yield of the products was as good as 92%.

In Example 2, compacts produced with a briquette forming machine and having a porosity of 33% were used. The values of V and Hin computed from the size and the porosity of the compacts were 1.8 g/kg/sec. and 5.0 kw/kg, respectively. Meanwhile, the actual water evaporation rate and heat supply rate were as low as 1.3 g/kg/sec. and 3.7 kw/kg, respectively. Therefore, explosion was not observed and further the powdering from the compact surfaces was as low as 2.6%. As a result of reducing the compacts, the iron metallization ratio was as high as 88% and the bulk yield of the products was as good as 88%.

In Example 3, compacts produced with an extrusion forming machine and having a porosity of 47%, which is a low packing density, were used. The values of V and Hin computed from the size and the porosity of the compacts were 3.9 g/kg/sec. and 10.7 kw/kg, respectively. Meanwhile, the actual water evaporation rate and heat supply rate were as low as 2.7 g/kg/sec. and 7.5 kw/kg, respectively. Therefore, explosion was not observed and further the powdering from the compact surfaces was as low as 3.3%. As a result of reducing the compacts, the iron metallization ratio was as high as 88% and the bulk yield of the products was as good as 86%. As it has been clarified above, as long as the drying conditions are controlled within the ranges stipulated in the present invention, the compacts are dried well and also reduced properly.

TABLE 2

|  | Comparative Example 1 | Comparative Example 2 | Comparative Example 3 |
|---|---|---|---|
| Forming machine | Pan-type pelletizer | Briquette forming machine | Extrusion forming machine |
| Compact | Spherical | Almond-shaped | Columnar |
| Size *) (mm) | 15 | 18 | 17 |
| Porosity (%) | 27% | 33% | 47% |
| Water content (mass %) | 11.5% | 14.6% | 21.2% |
| Critical value of drying |  |  |  |
| V value (g/kg · sec.) | 1.5 | 1.8 | 3.9 |
| Hin value (kw/kg) | 4.0 | 5.0 | 10.7 |
| Drying result |  |  |  |
| Actual water evaporation rate (g/kg · sec.) | 2.5 | 2.2 | 5.5 |
| Actual heat supply rate (kw/kg) | 5.8 | 5.9 | 13.9 |
| Evaluation of drying state |  |  |  |
| Existence of explosion | Occurred | Occurred | None |
| Powdering ratio (mass %) | 88% | 76% | 37% |
| Result of reduced product |  |  |  |
| Iron metallization ratio (mass %) | Not operable | Not operable | 56% |
| Bulk product yield (mass %) | — | — | 53% |

*) Cube root of compact volume

On the other hand, in Comparative Examples 1 to 3, the results were obtained by drying the same compacts as Examples 1 to 3 under the conditions deviating from those stipulated in the present invention and then reducing them. In any of Comparative Examples, as the water evaporation rate and the heat supply rate of the compacts were larger than the critical values respectively, the compacts were not dried properly. In the cases of Comparative Examples 1 and 2, the compacts exploded and 76 to 88% of the compacts were decomposed into powder. As a result, the reduction operation was not properly carried out in the rotary furnace 3. Further, in Comparative Example 3, the results were obtained by drying compacts produced with an extrusion forming machine and having a high porosity and then reducing them. In the drying of the compacts too, the water evaporation rate and the heat supply rate of the compacts were larger than the critical values shown by V and Hin respectively. As a result, though explosion did not occur, 37% of the compacts were decomposed into powder. As a result of incinerating and reducing the mixture of the bulk and powder of the compacts in the rotary furnace 3, the powdered portions were influenced by the reoxidation caused by carbon dioxide gas in the atmosphere, the iron metallization ratio was low, and the bulk yield of the products was also low.

Next, Table 3 shows the results of Examples 4 to 6 that are the examples of the operations carried out by the method wherein the compacts are dried in the rotary furnace 3 as shown in FIG. 3 or 4. The treatment conditions of Examples 4 to 6 are as follows. The raw material powder comprised 63 mass % iron oxide and 15 mass % carbon and the average diameter of the powder was 11 microns, which were the same as Examples 1 to 3. The compacts were formed likewise from the powder with three kinds of devices; a pan-type pelletizer, a briquette forming machine and an extraction forming machine. In the drying of the compacts in the furnace, the water evaporation rate was controlled to not more than V (critical evaporation rate) and the heat supply rate to not more than Hin (critical heat supply rate). Further, the compacts after being dried were successively incinerated and reduced in the same furnace. The reducing time was 13 mm. and the atmospheric temperature during the reduction was 1,300° C.

TABLE 3

|  | Example 4 | Example 5 | Example 6 |
|---|---|---|---|
| Forming machine | Pan-type pelletizer | Briquette forming machine | Extrusion forming machine |
| Compact | Spherical | Almond-shaped | Columnar |
| Size *) (mm) | 17 | 20 | 20 |
| Porosity (vol. %) | 27% | 33% | 47% |
| Water content (mass %) | 11.5% | 14.6% | 21.2% |
| Drying zone of rotary furnace |  |  |  |
| Structure of drying zone | Reducing zone and drying zone are separated by exhaust gas discharging flue, ceiling is equipped with cooling means. | Reducing zone and drying zone are separated by exhaust gas discharging flue, heating burners are installed | Reducing zone and drying zone are separated by exhaust gas discharging flue, heating burners are installed |
| Drying zone resident time (sec.) | 200 | 160 | 100 |
| Drying zone temperature | 250–450° C. | 450–750° C. | 700–950° C. |
| Critical value of drying |  |  |  |
| V value (g/kg · sec.) | 1.3 | 1.6 | 3.3 |
| Hin value (kw/kg) | 3.5 | 4.5 | 9.1 |
| Drying result |  |  |  |
| Actual water evaporation rate (g/kg · sec.) | 0.67 | 1.1 | 2.6 |
| Actual heat supply rate (kw/kg) | 1.8 | 3.1 | 7.5 |
| Evaluation of drying state |  |  |  |
| Existence of explosion | None | None | None |
| Powdering ratio (mass %) | 5.1% | 5.9% | 3.1% |
| Result of reduced product |  |  |  |
| Iron metallization ratio (mass %) | 84% | 81% | 83% |
| Bulk product yield (mass %) | 94% | 91% | 95% |

*) Cube root of compact volume

Example 4 is an example of the operation in the case of using spherical compacts produced with a pan-type pelletizer and having a porosity of 27%, which is relatively dense. The compacts have a low porosity and they explode easily when a water evaporation rate increases. Therefore, the atmospheric temperature in the drying zone 5 was controlled in the range from the lowest temperature of 250° C. to the highest temperature of 450° C. For that purpose, the exhaust gas discharging flue 10 was installed between the drying zone 5 and the reducing zone 7 so that exhaust gas generated in the reducing zone 7 might not flow into the drying zone 5. Further, in order to lower the atmospheric temperature and the hearth 6, the ceiling between the screw discharger 8 and the compact feeder 4 at the compact supply portion and parts of the ceiling in the drying zone 5 were equipped with water cooling means. As a result, the heat supply rate to the compacts could be reduced to 1.8 kw/kg, lower than Hin, and the water evaporation rate could also be reduced to 0.67 g/kg/sec., lower than V. The reducing treatment was also good and the powdering ratio was as low as 5.1% and the iron metallization ratio and the bulk product yield were high.

Example 5 is an example of the operation in the case of using almond-shaped compacts produced with a briquette forming machine and having a porosity of 33%. In this case, the heat supply rate to the compacts was controlled to not more than Hin and the water evaporation rate was also controlled to not more than V so that the compacts might not cause the problems of the explosion or powdering. For this purpose, the exhaust gas discharging flue 10 was installed between the drying zone 5 and the reducing zone 7 so that exhaust gas generated in the reducing zone 7 might not flow into the drying zone 5. Here, in the case of these compacts, the amount of the water vapor generated from the compacts is relatively large and, therefore, the atmospheric temperature in the drying zone 5 lowers in excess of the target temperature in some cases. For this reason, heat was supplemented with the heating burners 11 installed on the sidewalls and the atmospheric temperature was controlled in the range from the lowest temperature of 450° C. to the highest temperature of 750° C. As a result, the water evaporation rate was 1.1 g/kg/sec., lower than V. The iron metallization ratio and the bulk yield of the reduced products were good.

Example 6 is an example of the operation in the case of using columnar compacts produced with an extrusion forming machine and having a porosity of 47%. In this case too, the heat supply rate to the compacts was controlled to not more than Hin and the water evaporation rate was also controlled to not more than V so that the compacts might not cause the problems of the explosion or powdering. For this purpose, the exhaust gas discharging flue 10 was installed between the drying zone 5 and the reducing zone 7, similarly to Example 5. The compacts of Example 6 contained a large amount of water and therefore the atmospheric temperature in the drying zone 5 dropped considerably due to the water vapor. To cope with the problem, heat was supplemented with the heating burners 11 installed on the sidewalls and the atmospheric temperature was controlled in the range from the lowest temperature of 700° C. to the highest temperature of 950° C. As a result, the water evaporation rate was 3.3 g/kg/sec., lower than V. In this operation too, the iron metallization ratio and the bulk yield of the reduced products were good.

Next, as Example 7, iron oxide and sludge containing carbon in a quantity generated in the processes of the steelmaking industry were used as the raw material and formed into compacts and the compacts were reduced by using the reducing equipment shown in FIG. 5. The raw material used in the operation had the average diameter of 9 microns and the water content of 21%. The porosity of the compacts produced with the extraction forming machine was 44% and the representative diameter thereof was 15 mm. In Example 7, the temperature of the drying zone 5 was controlled in the range from 890° C. to 1,020° C. and the length of the drying zone 5 was 150 sec. in terms of the transit time of the hearth 6. As a result of drying the compacts under those conditions, the problems of the explosion and powdering of the compacts did not occur. The highest temperature in the reducing zone 7 was 1,300° C. and the reducing time was 13 min. The bulk yield of the reduced product of Example 7 was as high as 91% and the iron loss to dust was as low as 1.7%. Further, the iron metallization ratio was 88% and thus the reduction was also good.

INDUSTRIAL APPLICABILITY

The present invention makes it possible to dry compacts, made of powder containing water, properly and to reduce metal oxide economically in a rotary hearth reduction process. Further, the present invention is effective for the processing of sludge comprising metal oxide containing water in quantity and dust containing carbon.

The invention claimed is:

1. A method for drying compacts characterized by, in the event of drying compacts containing powder of metal oxide and carbon and also water in mass percentage by not less than 0.2 times the porosity in percentage, controlling the evaporation rate of water contained in said compacts to not more than the value V defined below;

$$V = 300 P^2 / D,$$

where, V means a critical evaporation rate of water (an evaporation rate of water per one dry mass kilogram of compacts (g/kg/sec.)), D a cube root of the volume of a compact (mm), and P a porosity (−).

2. A method for drying compacts according to claim 1, characterized by, in the event of drying compacts having a cube root of the volume of 5 to 21 mm and a porosity of 22 to 32% from the state wherein 4.4 mass % or more of water is contained in said compacts, controlling the evaporation rate of water in said compacts to not more than 0.7 g/sec. per one dry mass kilogram of compacts.

3. A method for drying compacts according to claim 1, characterized by, in the event of drying compacts having a cube root of the volume of 5 to 21 mm and a porosity of more than 32 to 40% from the state wherein 6.4 mass % or more of water is contained in said compacts, controlling the evaporation rate of water in said compacts to not more than 1.3 g/sec. per one dry mass kilogram of compacts.

4. A method for drying compacts according to claim 1, characterized by, in the event of drying compacts having a cube root of the volume of 5 to 21 mm and a porosity of more than 40 to 55% from the state wherein 8 mass % or more of water is contained in said compacts, controlling the evaporation rate of water in said compacts to not more than 2.3 g/sec. per one dry mass kilogram of compacts.

5. A method for drying compacts according to claim 1, characterized by using powder containing metallic oxide derived from a metal producing process and carbon individually or in mixture as said powder of a metal oxide and carbon.

6. A method for reducing metal oxide characterized by incinerating and reducing compacts dried by a method according to claim 5 at 1,100° C. or higher in a rotary-hearth-type furnace wherein compacts containing powder of metal oxide and carbon are loaded on the upper surface of a rotating toroidal hearth and incinerated and reduced by gas combustion heat at the upper inner space of the furnace.

7. A method for reducing metal oxide characterized by, after drying compacts by a method according to claim 5 in a rotary-hearth-type furnace wherein compacts containing powder of metal oxide and carbon are loaded on the upper surface of a rotating toroidal hearth and incinerated and reduced by gas combustion heat at the upper inner space of the furnace, successively incinerating and reducing said compacts at 1,100° C. or higher in said furnace.

8. A method for reducing metal oxide characterized by, after drying compacts by a method according to claim 1 in a rotary-hearth-type furnace wherein compacts containing powder of metal oxide and carbon are loaded on the upper surface of a rotating toroidal hearth and incinerated and reduced by gas combustion heat at the upper inner space of the furnace, successively incinerating and reducing said compacts at 1,100° C. or higher in said furnace.

9. A method for drying compacts characterized by, in the event of drying compacts containing powder of metal oxide and carbon and also water in mass percentage by not less than 0.2 times the porosity in percentage, controlling the rate of heat supply to said compacts to not more than the value Hin defined below;

$$Hin = 820 P^2/D,$$

where, Hin means a critical heat supply rate (a heat supply rate per one dry mass kilogram of compacts (kw/kg)), D a cube root of the volume of a compact (mm), and P a porosity (–).

10. A method for drying compacts according to claim 9, characterized by, in the event of drying compacts having a cube root of the volume of 5 to 21 mm and a porosity of 22 to 32% from the state wherein 4.4 mass % or more of water is contained in said compacts, controlling the rate of heat supply to said compacts to not more than 1.9 kw per one dry mass kilogram of compacts.

11. A method for drying compacts according to claim 9, characterized by, in the event of drying compacts having a cube root of the volume of 5 to 21 mm and a porosity of more than 32 to 40% from the state wherein 6.4 mass % or more of water is contained in said compacts, controlling the rate of heat supply to said compacts to not more than 3.5 kw per one dry mass kilogram of compacts.

12. A method for drying compacts according to claim 9, characterized by, in the event of drying compacts having a cube root of the volume of 5 to 21 mm and a porosity of more than 40 to 55% from the state wherein 8 mass % or more of water is contained in said compacts, controlling the rate of heat supply to said compacts to not more than 6.2 kw per one dry mass kilogram of compacts.

13. A method for reducing metal oxide characterized by incinerating and reducing compacts dried by a method according to claim 1 at 1,100° C. or higher in a rotary-hearth-type furnace wherein compacts containing powder of metal oxide and carbon are loaded on the upper surface of a rotating toroidal hearth and incinerated and reduced by gas combustion heat at the upper inner space of the furnace.

* * * * *